(12) United States Patent
Chung et al.

(10) Patent No.: US 8,252,382 B2
(45) Date of Patent: Aug. 28, 2012

(54) ALUMINUM WHEEL HAVING HIGH GLOSS

(75) Inventors: Kwang-Choon Chung, Gyeonggi-do (KR); Hyun-Nam Cho, Gyeonggi-do (KR); Seong-Yong Uhm, Gyeonggi-do (KR)

(73) Assignee: Inktec Co., Ltd., Kyeongki-do (KR)

( * ) Notice: Subject to any disclaimer, the term of this patent is extended or adjusted under 35 U.S.C. 154(b) by 433 days.

(21) Appl. No.: 12/226,780

(22) PCT Filed: Apr. 28, 2007

(86) PCT No.: PCT/KR2007/002105
§ 371 (c)(1),
(2), (4) Date: Apr. 3, 2009

(87) PCT Pub. No.: WO2007/126277
PCT Pub. Date: Nov. 8, 2007

(65) Prior Publication Data
US 2009/0269595 A1    Oct. 29, 2009

(30) Foreign Application Priority Data
Apr. 29, 2006  (KR) .................. 10-2006-0039108

(51) Int. Cl.
*B05D 1/26*  (2006.01)
*B05D 5/00*  (2006.01)
*B32B 15/20* (2006.01)

(52) U.S. Cl. .............. 427/402; 205/71; 205/72; 205/79; 427/107; 427/125; 427/162; 428/673

(58) Field of Classification Search .................. None
See application file for complete search history.

(56) References Cited

U.S. PATENT DOCUMENTS

| | | | |
|---|---|---|---|
| 3,528,845 A * | 9/1970 | Donley | 427/168 |
| 3,979,382 A | 9/1976 | Martinez-Alvarez et al. | |
| 4,330,437 A * | 5/1982 | Krueger | 502/344 |
| 4,542,214 A | 9/1985 | Bechara | |
| 4,546,046 A * | 10/1985 | Etzell et al. | 428/460 |
| 4,652,465 A | 3/1987 | Koto et al. | |
| 5,593,785 A * | 1/1997 | Mayo et al. | 428/423.1 |
| 6,387,542 B1 * | 5/2002 | Kozlov et al. | 428/673 |
| 6,440,290 B1 | 8/2002 | Vega et al. | |

(Continued)

FOREIGN PATENT DOCUMENTS
KR    10-2004-0034225    5/2004
(Continued)

*Primary Examiner* — Michael Cleveland
*Assistant Examiner* — Francisco Tschen
(74) *Attorney, Agent, or Firm* — Clark & Brody

(57) ABSTRACT

The present invention relates to an aluminum wheel having high gloss and a method for manufacturing the same, and the method for manufacturing an aluminum wheel having high gloss includes the steps of: (i) coating a primary coating powder paints for increasing a flatness of an aluminum wheel having a rough surface and improving an adhesive force to a silver mirror coating surface, (ii) forming of silver coating layer forming a mirror surface having a high gloss and high reflectivity on the powder paints coated surface using a silver coating solution, and (iii) forming at least one transparent top coating for protecting the silver mirror surface and increasing an abrasion resistance and a saltwater resistance after the step (ii). In accordance with the present in an aluminum wheel having high gloss and high reflectivity can be manufactured in a simple processes and relative inexpensive cost.

19 Claims, 4 Drawing Sheets

U.S. PATENT DOCUMENTS

| | | | |
|---|---|---|---|
| 2002/0102416 A1* | 8/2002 | Mayzel | 428/447 |
| 2003/0108664 A1* | 6/2003 | Kodas et al. | 427/125 |
| 2005/0123621 A1* | 6/2005 | Burton et al. | 424/618 |
| 2005/0129843 A1* | 6/2005 | Wu et al. | 427/180 |
| 2006/0035039 A1 | 2/2006 | Ylitalo et al. | |

FOREIGN PATENT DOCUMENTS

| | | |
|---|---|---|
| KR | 10-2005-0109171 | 11/2005 |
| KR | 10-2006-0011083 | 2/2006 |
| KR | 10-2005-0109171 | * 11/2007 |

* cited by examiner

[Figure 1]
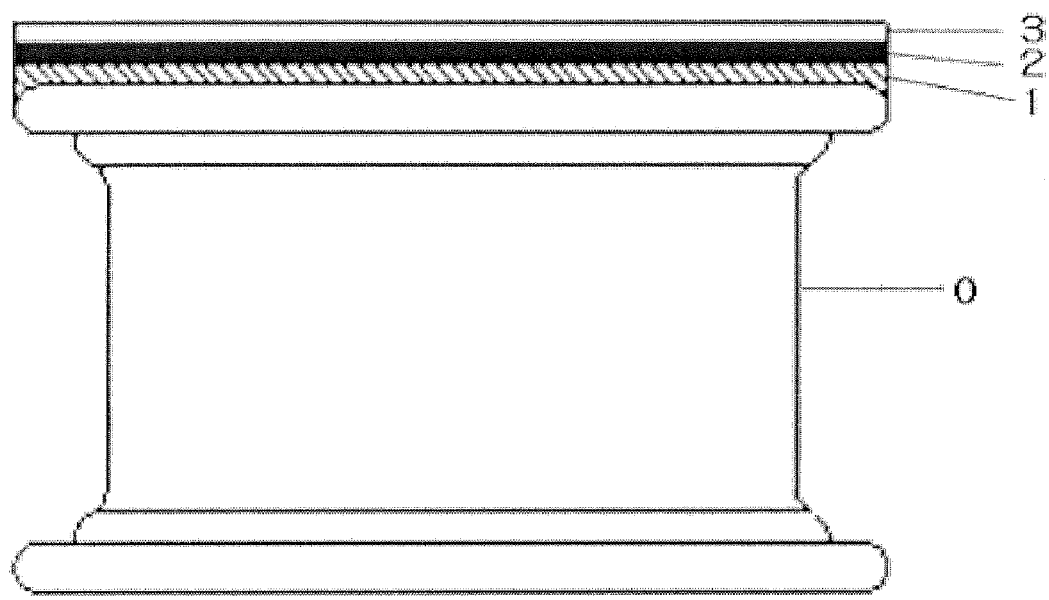

[Figure 2]
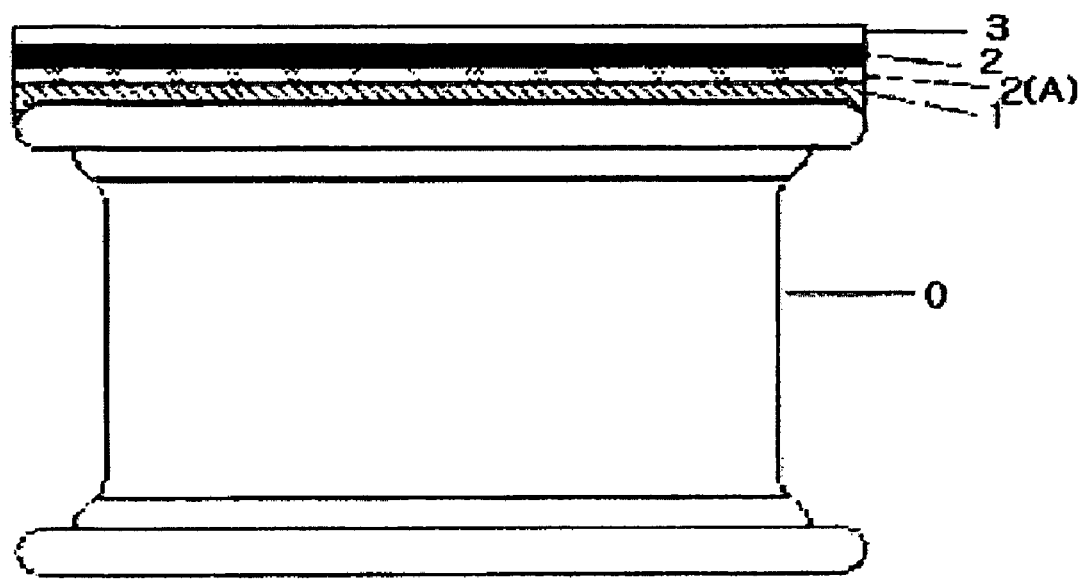

[Figure 3]
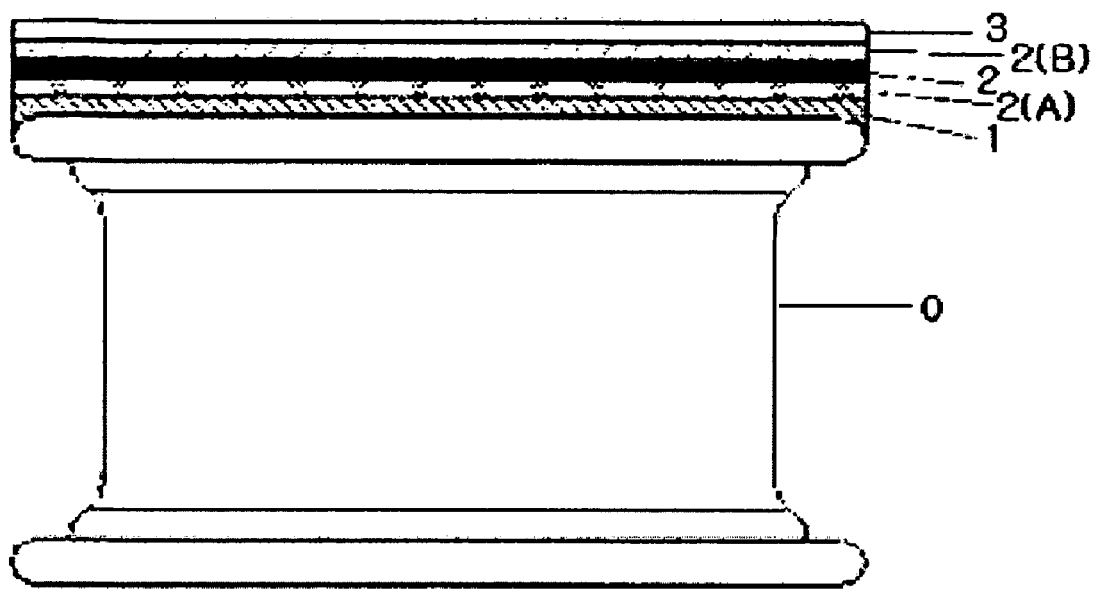

[Figure 4]
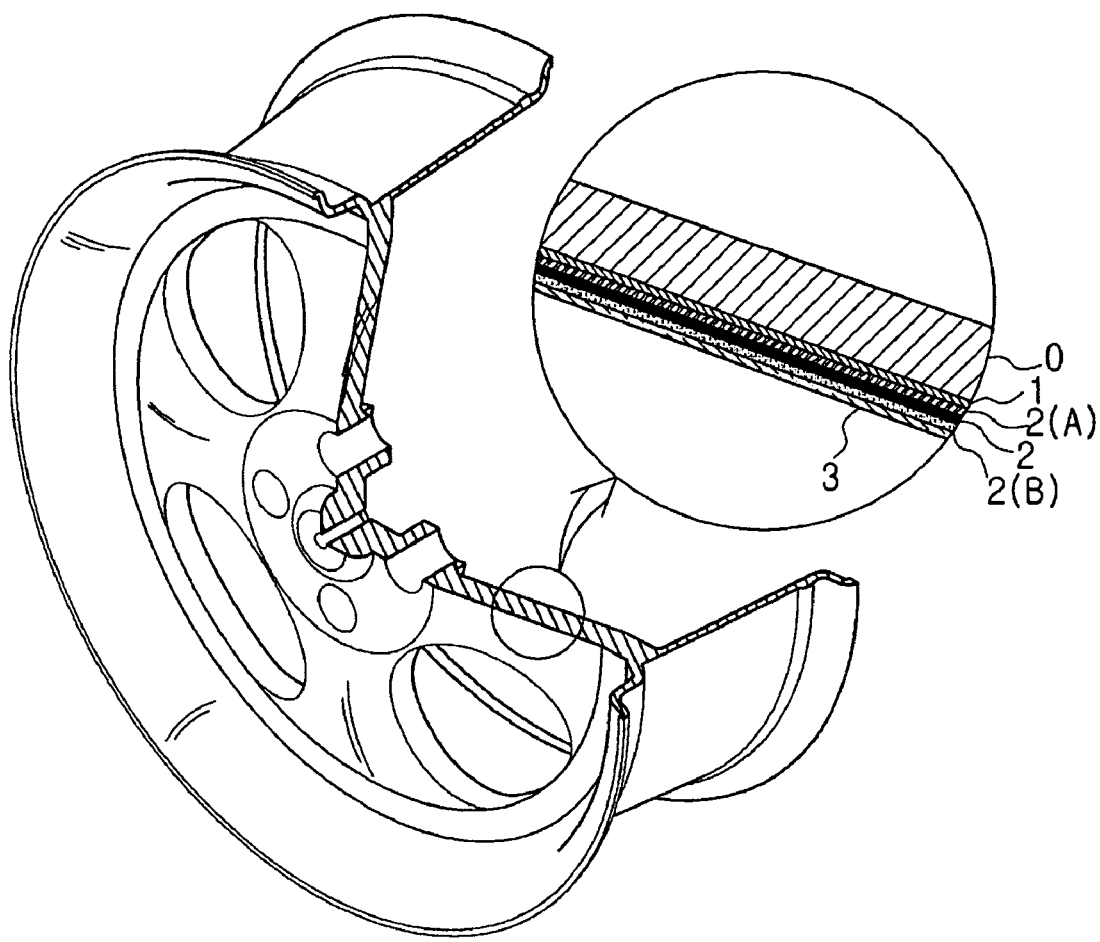

ALUMINUM WHEEL HAVING HIGH GLOSS

TECHNICAL FIELD

The present invention relates to an aluminum wheel having high gloss and a method for manufacturing the same, and more particularly, to a method for manufacturing an aluminum wheel having high gloss by increasing a flatness of the aluminum wheel having a rough surface using powder paints, applying thereto silver coating solution containing a silver complex compound having a special structure to form a high reflective silver mirror surface and then forming a transparent coating to protect the silver mirror surface.

BACKGROUND ART

Many efforts to meet various customers' needs have been made in fields of an automotive industry and one of the fields is a surface treatment and painting to an aluminum wheel for an automobile. The aluminum wheel has an elegant appearance and easy operability of steering wheel due to a light weight when travelling. In addition, the aluminum wheel has function of protecting a tire from overheat since it has high thermal conductivity and thus heat generated from the tire due to friction with the ground when travelling is quickly exhausted. However, the aluminum wheel has disadvantages that its surface is rough since it is manufactured by casting and it has low corrosion resistance and low abrasion resistance due to its own properties.

To treat a surface of the aluminum wheel having functionally superior effect is used a surface treatment by electrolytic plating of the aluminum wheel surface using chromium, by which luxury surface gloss and high reflectivity can be obtained and abrasion resistance, which does not easily permit a generation of scars, is superior due to a high hardness, whereas cost for plating treatment is excessively taken and there are problems of air pollution and waste water during plating process because the aluminum wheel having a rough surface should be polished several times. Therefore, an import and export of an automobile coated with hexavalent chromium having $CrO_3$ as a main element is forbidden in the world including U.S. and E.U. Meanwhile, a treatment method in which the surface of the aluminum is vacuum deposited using a metal such as a silver(Ag), a nickel(Ni), a titanium(Ti) and so on is also used, however there are problems that a chamber of a high vacuum is required, a shape and a size of the wheel is limited, a coating thickness is uneven and an equipment cost is high.

Therefore, continuous effort of the present inventors to solve the above problems results successfully in an approach to the present invention. In other words, the present invention, through continuous experiments, provides a method for manufacturing an aluminum wheel, in which the aluminum wheel shows various metal textures and has a superior gloss, a process is relatively simple and a manufacturing cost is inexpensive.

DISCLOSURE

Technical Problem

It is an object of the present invention to provide a method for manufacturing an aluminum wheel having high gloss by increasing a flatness of the aluminum wheel having a rough surface using powder paints, applying thereto silver coating solution containing a silver complex compound having a special structure to form a high reflective silver mirror surface and then forming a transparent coating to protect the silver mirror surface.

It is another object of the present invention to provide an aluminum wheel and a method for manufacturing the same, which can be mass produced without air pollution and water pollution and a process is simple, thus an error rate is low and a cost for manufacture is inexpensive.

Technical Solution

An aspect of the invention, to achieve the above objects, is a method for manufacturing an aluminum wheel having a high gloss, which includes the steps of: (i) coating a primary coating powder paints for increasing a flatness of an aluminum wheel having a rough surface and improving an adhesive force of a silver mirror coating surface and (ii) forming of silver coating layer forming a mirror surface having high gloss and high reflectivity on the powder paints coated surface using a silver coating solution, and may further include (iii) forming at least one transparent top coating for protecting the silver mirror surface and increasing an abrasion resistance and a saltwater resistance after the step (ii).

Hereinafter, the present invention is described in detail with reference to drawings.

FIG. 1 is a sectional view illustrating an aluminum wheel 0 constructed with a primary powder coating surface 1, an intermediate coating surface 2 which is a silver mirror surface and a transparent top coating surface 3.

Step (i):

Firstly, a corona electrostatic coating using a powder paints is implemented to the aluminum wheel having a rough surface to form the primary coating surface 1 which increases a close adhesive force with an aluminum wheel and has a high flatness. The powder paints used in the present invention mainly includes a thermosetting resin and a curing agent and, if necessary, may further include a leveling agent, a wetting agent, an adhesion promoter, a ultraviolet stabilizer, a colorant and so on and a mixture thereof is used after mixed evenly using a mixer, extruded and then pulverized to a proper particle size. The thermosetting resin is not particularly limited. Any known thermosetting resin may be used if it meets the object of the invention. For example, polyester, epoxy, acryl and polyester-epoxy hybrid thermosetting resin may be used. As the curing agent, 1,3,5-triglycidyl isocyanurate and block isocyanurate may be used in the case of the polyester, ammonia, amines such as diethylenetriamine, hexamethylenetriamine, methanediamine, xylenediamine and isophoronediamine and dicyandiamide may be used in the case of the epoxy, and polyester type carboxyl acid may be used in the case of the acryl. In addition, in order to prevent generation of a pinhole and crater which have an influence on a high reflective mirror surface and form the primary coating having a good flatness, the leveling agent and the wetting agent are used and the examples thereof include Surfynol series, a product of Air Product & Chemicals Inc., TEGOwet series available from Deguessa Corporation, BYK series available from BYK Chemie Co., Ltd., glide series available from Deguessa Corporation, EFKA 3000 series available from EFKA Corp., DSX series available from Cognis Corporation, Powdermate series available from TROY Chemical Corp., acryl oligomer available from KSCNT Co., Ltd. and so on. As the adhesion promoter, wax emulsion, amide wax, carnauba wax, PE wax, and silane coupling agent such as trimethoxy propyl silane, vinyl triethoxy silane and mercaptopropyl trimethoxysilane, or titanium based, zirconium based and aluminum based coupling agents may be used. In addition, as the ultraviolet stabilizer, benzophenone based, benzotriazole based, nickel chelater based, salicylic acid based, benzoate based and hals based derivatives may be used and typical examples includes a TINUVIN series and a Chimassorb series available from Ciba Speciality Chemicals. The powder paints composition for the primary coating obtained as described above is applied to the aluminum wheel in a spray manner by the corona electrostatic coating and treated in an oven at 150° C. for 30 minutes, thereby obtaining a paint film having a high flatness.

Step (ii):

In this step, the primary coating surface 1 coated with the powder paints formed in the step 1 is applied with silver coating solution containing a silver complex compound which is obtained by reacting at least one silver compound represented by the following chemical formula 1 with at least one ammonium carbamate or ammonium carbonate based compound represented by the chemical formula 2, the chemical formula 3 or the chemical formula 4 and then calcinated thereby forming the silver mirror surface 2 having high gloss and high reflectivity.

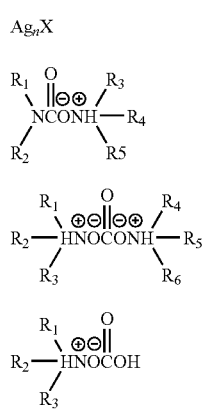

Chemical formula 1

Chemical formula 2

Chemical formula 3

Chemical formula 4 wherein, in the chemical formulas, X represents a substituent selected from oxygen, sulfur, halogen, cyano, cynate, carbonate, nitrate, nitrite, sulfate, phosphate, thiocyanate, chlorate, perchlorate, tetrafluoroborate, acetylacetonate, carboxylate and derivatives thereof, n represents an integer of 1 to 4, and each of $R_1$ to $R_6$ represents independently hydrogen, $C_1$-$C_{30}$ aliphatic or cycloaliphatic alkyl, aryl or aralkyl group, substituted alkyl or aryl group, a heterocyclic compound, a polymeric compound and a derivative thereof.

In the chemical formula 1, n represents an integer of 1 to 4, and X represents a substituent selected from oxygen, sulfur, halogen, cyano, cynate, carbonate, nitrate, nitrite, sulfate, phosphate, thiocyanate, chlorate, perchlorate, tetrafluoroborate, acetylacetonate, carboxylate and derivative thereof and specific examples of the silver compound may include, but not limited to, silver oxide, silver thiocyanate, silver sulfide, silver chloride, silver cyanide, silver cyanate, silver carbonate, silver nitrate, silver nitrite, silver sulfate, silver phosphate, silver perchlorate, silver tetrafluoroborate, silver acetylacetonate, silver acetate, silver lactate, silver oxalate or a derivative thereof.

In the chemical formulas 2 to 4, each of R1 to R6 may be independently selected from, but not particularly limited to, hydrogen, methyl, ethyl, propyl, isopropyl, butyl, isobutyl, amyl, hexyl, ethylhexyl, heptyl, octyl, isooctyl, nonyl, decyl, dodecyl, hexadecyl, octadecyl, docodecyl, cyclopropyl, cyclopentyl, cyclohexyl, allyl, hydroxy, methoxy, hydroxyethyl, methoxyethyl, 2-hydroxy propyl, methoxypropyl, cyanoethyl, ethoxy, butoxy, hexyloxy, methoxyethoxyethyl, methoxyethoxyethoxyethyl, hexamethyleneimine, morpholine, piperidine, piperazine, ethylenediamine, propylenediamine, hexamethylenediamine, triethylenediamine, pyrrole, imidazole, pyridine, carboxymethyl, trimethoxysilylpropyl, triethoxysilylpropyl, phenyl, methoxyphenyl, cyanophenyl, phenoxy, tolyl, benzyl, a derivative thereof, and a polymer compound such as polyallylamine and polyethyleneamine, and a derivative thereof. The compound may be, for example, one or a mixture of more than two selected from ammonium carbamate, ammonium carbonate, ammonium bicarbonate, ethylammonium ethylcarbamate, isopropylamonium isopropylcarbamate, n-butylammonium n-butylcarbamate, isobutylammonium isobutylcarbamate, t-butylammonium t-butylcarbamate, 2-ethylhexylammonium 2-ethylhexylcarbamate, octadecylammonium octadecylcarbamate, 2-methoxyethylammonium 2-methoxyethylcarbamate, 2-cyanoethylammonium 2-cyanoethylcarbamate, dibutylammonium dibutylcarbamate, dioctadecylammonium dioctadecylcarbamate, methyldecylammonium methyldecylcarbamate, hexamethyleneiminium hexamethyleneiminecarbamate, morpholinium morpholinecarbamate, pyridinium ethylhexylcarbamate, triethylenediaminium isopropylbicarbamate, benzylammonium benzylcarbamate, triethoxysilylpropylammonium triethoxysilylpropylcarbamate, ethylammonium ethylcarbonate, isopropylammonium isopropylcarbonate, isopropylammonium bicarbonate, n-butylammonium n-butylcarbonate, isobutylammonium isobutylcarbonate, t-butylammonium t-butylcarbonate, t-butylammonium bicarbonate, 2-ethylhexylammonium 2-ethylhexylcarbonate, 2-ethylhexylammonium bicarbonate, 2-methoxyethylammonium 2-methoxyethylcarbonate, 2-methoxyethylammonium bicarbonate, 2-cyanoethylammonium 2-cyanoethylcarbonate, 2-cyanoethylammonium bicarbonate, octadecylammonium octadecylcarbonate, dibutylammonium dibutylcarbonate, dioctadecylammonium dioctadecylcarbonate, dioctadecylammonium bicarbonate, methyldecylammonium methyldecylcarbonate, hexamethyleneiminium hexamethyleneiminecarbonate, morpholinium morpholinecarbonate, benzylammonium benzylcarbonate, triethoxysilylpropylammonium triethoxysilylpropylcarbonate, pyridinium bicarbonate, triethylenediaminium isopropylcarbonate, triethylenediaminium bicarbonate and a derivative thereof.

Meanwhile, kind of the ammonium carbamate or the ammonium carbonate based compound, and preparation method thereof are not particularly limited. For example, U.S. Pat. No. 4,542,214 (Sep. 17, 1985) discloses that the ammonium carbamate based compound can be prepared from primary amine, secondary amine, tertiary amine or a mixture thereof and carbon dioxide, an ammonium carbonate based compound is obtained if 0.5 mole of water is further added per 1 mole of amine and an ammonium bicarbonate based compound is obtained if more than 1 mole of water is further added per 1 mole of amine. The preparation may be performed under normal pressure or applied pressure with or without a solvent. When a solvent is used, water, an alcohol such as methanol, ethanol, isopropanol and butanol, a glycol such as ethylene glycol and glycerine, an acetate such as ethyl acetate, butyl acetate and carbitol acetate, an ether such as diethyl ether, tetrahydrofuran and dioxane, a ketone such as methyl ethyl ketone and acetone, a hydrocarbon solvent such as hexane and heptane, an aromatic solvent such as benzene and toluene, a halogen-substituted solvent such as chloroform, methylene chloride and carbon tetrachloride, and a mixture thereof, etc. may be used. Carbon dioxide may be bubbled in the gas phase or solid dry ice may be used. The reaction may be performed in the supercritical state. Any other known methods can be applied for the preparation of the ammonium carbamate derivative and the ammonium carbonate derivative, as long as the structure of the target compound is the same. In other words, preparation solvent, reaction temperature, concentration, and usage of catalyst, etc. are not particularly limited and the preparation yield is also irrelevant of the preparation method.

Such prepared ammonium carbamate or ammonium carbonate based compound is reacted with the silver compound to obtain the organic silver complex compound. For example, at least one silver compound represented by the chemical formula 1 may be reacted with at least one ammonium carbamate or ammonium carbonate derivative and a mixture thereof represented by the chemical formula 2 to chemical formula 4 under nitrogen atmosphere at normal pressure or applied pressure with or without a solvent. When a solvent is used, water, an alcohol such as methanol, ethanol, isopropanol and butanol, a glycol such as ethylene glycol and glycerine, an acetate such as ethyl acetate, butyl acetate and carbitol acetate, an ether such as diethyl ether, tetrahydrofuran and dioxane, a ketone such as methyl ethyl ketone and acetone, a hydrocarbon solvent such as hexane and heptane, an aromatic solvent such as benzene and toluene, halogen-substituted solvent such as chloroform, methylene chloride and carbon tetrachloride, or a mixture thereof, etc. may be used.

Besides the above mentioned preparation method, a mixture solution of the silver compound represented by the chemical formula 1 and at least one amine compound may be prepared and reacted with carbon dioxide thereby preparing the silver complex compound used in the present invention. The reaction may be performed under nitrogen atmosphere at normal pressure or applied pressure with or without a solvent. However, any other known methods may be used as long as the structure of the target compound is the same. In other words, preparation solvent, reaction temperature, concentration and usage of catalyst, etc. are not particularly limited and the preparation yield is also irrelevant of the preparation method.

The method for preparation of the silver complex compound according to the present invention is disclosed in Korean Patent Application No. 10-2006-0011083 by the present inventors.

The silver coating solution composition used for forming the silver mirror surface 2 having high gloss and high reflectivity according to the present invention includes the above mentioned silver complex compound and may further includes additives such as a solvent, a stabilizer, a leveling agent and a thin film assistant if necessary.

Meanwhile, the stabilizer may include, for example, an amine compound such as primary amine, secondary amine and tertiary amine, an ammonium carbamate, ammonium carbonate or ammonium bicarbonate based compound described above, a phosphorus compound such as phosphine and phosphite or a sulfur compound such as thiol and sulfide, and at least one mixture thereof. Specifically, the amine compound may be methylamine, ethylamine, n-propylamine, isopropylamine, n-butylamine, isobutylamine, isoamylamine, n-hexylamine, 2-ethylhexylamine, n-heptylamine, n-octylamine, isooctylamine, nonylamine, decylamine, dodecylamine, hexadecylamine, octadecylamine, docodecylamine, cyclopropylamine, cyclopentylamine, cyclohexylamine, allylamine, hydroxyamine, ammonium hydroxide, methoxyamine, 2-ethanolamine, methoxyethylamine, 2-hydroxypropylamine, 2-hydroxy-2-methylpropylamine, methoxypropylamine, cyanoethylamine, ethoxyamine, n-butoxyamine, 2-hexyloxyamine, methoxyethoxyethylamine, methoxyethoxyethoxyethylamine, diethylamine, dipropylamine, diethanolamine, hexamethyleneimine, morpholine, piperidine, piperazine, ethylenediamine, propylenediamine, hexamethylenediamine, triethylenediamine, 2,2-(ethylenedioxy)bisethylamine, triethylamine, triethanolamine, pyrrole, imidazole, pyridine, aminoacetaldehyde dimethyl acetal, 3-aminopropyltrimethoxysilane, 3-aminopropyltriethoxysilane, aniline, anisidine, aminobenzonitrile, benzylamine, derivatives thereof or polymer compounds such as polyallylamine and polyethyleneimine or derivatives thereof. The ammonium carbamate, ammonium carbonate or ammonium bicarbonate based compound may include, for example, ammonium carbamate, ammonium carbonate, ammonium bicarbonate, ethylammonium ethylcarbamate, isopropylammonium isopropylcarbamate, n-butylammonium n-butylcarbamate, isobutylammonium isobutylcarbamate, t-butylammonium t-butylcarbamate, 2-ethylhexylammonium 2-ethylhexylcarbamate, octadecylammonium octadecylcarbamate, 2-methoxyethylammonium 2-methoxyethylcarbamate, 2-cyanoethylammonium 2-cyanoethylcarbamate, dibutylammonium dibutylcarbamate, dioctadecylammonium dioctadecylcarbamate, methyldecylammonium methyldecylcarbamate, hexamethyleneiminium hexamethyleneiminecarbamate, morpholinium morpholinecarbamate, pyridinium ethylhexylcarbamate, triethylenediaminium isopropylcarbamate, benzylammonium benzylcarbamate, triethoxysilylpropylammonium triethoxysilylpropylcarbamate, ethylammonium ethylcarbonate, isopropylammonium isopropylcarbonate, isopropylammonium bicarbonate, n-butylammonium n-butylcarbonate, isobutylammonium isobutylcarbonate, t-butylammonium t-butylcarbonate, t-butylammonium bicarbonate, 2-ethylhexylammonium 2-ethylhexylcarbonate, 2-ethylhexylammonium bicarbonate, 2-methoxyethylammonium 2-methoxyethylcarbonate, 2-methoxyethylammonium bicarbonate, 2-cyanoethylammonium 2-cyanoethylcarbonate, 2-cyanoethylammonium bicarbonate, octadecylammonium octadecylcarbonate, dioctadecylammonium bicarbonate, dibutylammonium dibutylcarbonate, dioctadecylammonium dioctadecylcarbonate, dioctadecylammonium bicarbonate, methyldecylammonium methyldecylcarbonate, hexamethyleneiminium hexamethyleneiminecarbonate, morpholinium morpholinecarbonate, benzylammonium benzylcarbonate, triethoxysilylpropylammonium triethoxysilylpropylcarbonate, pyridinium bicarbonate, triethylenediaminium isopropylcarbonate, triethylenediaminium bicarbonate or derivatives thereof. The phosphorus compound may include a compound represented by the following chemical formula 6, chemical formula 7 or chemical formula 8.

$R_3P$ [Chemical formula 6]

$(RO)_3P$ [Chemical formula 7]

$(RO)_3PO$ [Chemical formula 8]

wherein, in the chemical formulas, R represents a substituent selected from $C_1$-$C_{20}$ alkyl or aryl group.

The compound represented by the chemical formula 6, chemical formula 7 or chemical formula 8 may include tributylphosphine, triphenylphosphine, triethylphosphite and triphenylphosphite. The sulfur compound may include butanethiol, n-hexanethiol, diethyl sulfide, tetrahydrothiophene, allyl disulfide, 2-mercaptobenzoazole, tetrahydrothiophene octylthioglycolate, etc. The content of the stabilizer is not particularly limited, as long as it meets the ink property of the present. However, it is preferable that its content is 0.1 to 90% of the silver compound in molar ratio. In addition, the thin film assistant may include an organic acid and an organic acid derivative, and is composed of at least one mixture thereof. Specifically, the organic acid may include acetic acid, butyric acid, valeric acid, pivalic acid, hexane acid, octanoic acid, 2-ethyl-hexane acid, neodecanoic acid, lauric acid, stearic acid and naphthalic acid, etc., and the organic acid derivative may include ammonium salts of an organic acid such as ammonium acetate salt, ammonium citrate salt, ammonium laurate salt, ammonium lactate salt, ammonium maleate salt, ammonium oxalate salt and ammonium molybdate salt, etc. and metal salts of organic acid such as manganese oxalate, gold acetate, palladium oxalate, silver 2-ethylhexanoate, silver octanoate, silver neodecanoate, cobalt stearate, nickel naphthalate and cobalt naphthalate, etc., which includes metals such as Au, Cu, Zn, Ni, Co, Pd, Pt, Ti, V, Mn, Fe, Cr, Zr, Nb, Mo, W, Ru, Cd, Ta, Re, Os, Ir, Al, Ga, Ge, In, Sn, Sb, Pb, Bi, Sm, Eu, Ac, Th, etc. Content of the thin film assistant is preferably, but not limited to, 0.1 to 25% of the silver complex compound in molar ratio.

In a case that a solvent is required to control the viscosity of the silver coating solution composition or to facilitate film formation, water, an alcohol such as methanol, ethanol, isopropanol, 1-methoxypropanol, butanol, ethylhexyl alcohol and terpineol, a glycol such as ethylene glycol and glycerine, an acetate such as ethyl acetate, butyl acetate, methoxypropyl acetate, carbitol acetate and ethylcarbitol acetate, an ether such as methylcellosolve, butylcellosolve, diethyl ether, tetrahydrofuran and dioxane, a ketone such as methyl ethyl ketone, acetone, dimethylformamide and 1-methyl-2-pyrrolidone, a hydrocarbon solvent such as hexane, heptane, dodecane, paraffin oil and mineral spirit, an aromatic solvent such as benzene, toluene and xylene, a halogen-substituted solvent such as chloroform, methylene chloride and carbon tetrachloride, acetonitrile, dimethylsulfoxide or a mixture thereof, etc may be used.

The silver coating solution composition may be coated on an aluminum wheel by any method such as brushing, spray coating, dip coating and so on and the coated aluminum wheel may be oxidized, reduced, heat-treated or treated with IR, UV, electron beam or laser to form the silver mirror surface 2. In the above mentioned after-treatment process, the coated aluminum wheel may be heat-treated under inert gas atmosphere as usually, but also may be heat-treated in air, nitrogen gas or carbon monoxide gas, or a mixture gas of hydrogen and air or other inert gas if necessary. Also, the heat treatment is performed at 80 to 400° C., preferably at 90 to 300° C., more preferably at 100 to 250° C. In addition, it is preferable that the heat treatment is performed more than two times at a low temperature and a high temperature within the above mentioned range for evenness of the thin film. For example, it is preferable that the heat treatment is performed at 80 to 150° for 1 to 30 minutes and then at 150 to 300° C. for 1 to 30 minutes.

Step (iii):

In this step, a transparent coating is applied to the silver mirror surface 2 formed in the above step (ii) for the purpose of protecting the silver mirror surface 2 and a transparent coating solution used for forming the transparent top coating surface 3 is not particularly limited. In other words, any of known transparent coating solution may be used as long as it meets the object of the invention, but the paint film should have a transparency of more than 90% after applying or coating and have superior abrasion resistance, weather resistance, corrosion resistance and salt water resistance. The coating solution used for the above transparent top coating may include a separate reduction agent and specific examples of the reduction agent include hydrazine, acetic hydrazide, sodium or potassium borohydride, trisodium citrate, an amine compound such as methyldiethanolamine and dimethylamine borane, a metal salt such as ferrous chloride and iron sulfate, hydrogen, hydrogen iodide, carbon monoxide, an aldehyde compound such as formaldehyde and acetaldehyde, an organic compound such as glucose, salicylic acid, tannic acid, pyrogallol and hydroquinone. Like in the powder paints for primary coating, an ultraviolet stabilizer may be used and includes, for example, benzophenone based, benzotriazole based, nickel chelater based, salicylic acid based, benzoate based and hals based derivatives and the typical example is a TINUVIN series and a Chimassorb series available from Ciba Specialty Chemicals.

In the present invention, in the case that the adhesive force between coating surface of the powder paints and the high glossy silver mirror surface is not sufficient or formation of the silver mirror surface having high gloss and high reflectivity is not satisfactory, a separate primer may be coated and dried to form a precoat surface 2A thereby capable of improving the adhesive force and the gloss and controlling the color tone of the silver mirror surface. The primer is an liquid paint and not particularly limited. In other words, any known primer may be used as long as it meets the object of the present invention. As the primer, for example, alkyd resin, polyester resin, silicon resin, polyurethane resin, epoxy resin, phenol resin, polyamide resin, melamine resin, acryl resin, unsaturated polyester resin and polyvinyl butyral resin may be used.

In addition, in order to improve the adhesive force between the silver mirror surface 2 having high gloss and the transparent top coating surface 3 and control the transparency and color change, a separate transparent coating is applied to the sliver mirror surface 2 to form a post coat surface 2B and then the transparent top coating surface is coated and dried thereby manufacturing an aluminum wheel having a high gloss. To form the post coat surface 2B, resins such as water dispersion urethane resin, silicon resin and acryl resin, metal compounds such as silane coupling agent, zirconium coupling agent, titanium coupling agent and metal precursor and it is not particularly limited as long as it has a high transparency and is capable of forming a thin film. Meanwhile, silver complex compound, which is not completely calcined and exists on the high glossy sliver mirror surface 2, can be treated with a reduction agent and specific examples of the reduction agent include hydrazine, acetic hydrazide, sodium or potassium borohydride, trisodium citrate, an amine compound such as methyldiethanolamine and dimethylamine borane, a metal salt such as ferrous chloride and iron sulfate, hydrogen, hydrogen iodide, carbon monoxide, an aldehyde compound such as formaldehyde and acetaldehyde, an organic compound such as glucose, salicylic acid, tannic acid, pyrogallol and hydroquinone.

DESCRIPTION OF DRAWINGS

FIG. 1 is a sectional view illustrating an aluminum wheel 0, which includes a powder primary coating surface 1, an intermediate coating surface 2 with a silver mirror surface and a transparent top coating surface 3.

FIG. 2 is a sectional view illustrating an aluminum wheel 0, which includes a powder primary coating surface 1, a precoat surface 2A, an intermediate coating surface 2 with a silver mirror surface and a transparent top coating surface 3.

FIG. 3 is a sectional view illustrating an aluminum wheel 0, which includes a powder primary coating surface 1, a precoat surface 2A, an intermediate coating surface 2 with a silver mirror surface, a post coat surface 2B and a transparent top coating surface 3.

FIG. 4 is a partially broken perspective view illustrating an aluminum wheel formed with a coating layer according to the present invention.

DETAILED DESCRIPTION OF MAIN ELEMENTS

0: aluminum wheel
1: primary powder coating surface
2: intermediate coating surface
2A: precoat surface
2B: post coat surface
3: top coating surface

Best Mode

Practical and presently preferred embodiments of the present invention are illustrative as shown in the following Examples and Comparative Examples.

However, it will be appreciated that those skilled in the art, on consideration of this disclosure, may make modifications and improvements within the spirit and scope of the present invention.

EXAMPLES

An intermediate blend of powder paints prepared using ingredients composed as the following table 1 was evenly mixed in a henschel mixer, extruded and then pulverized to a proper particle size. The pulverized powder was applied to an aluminum wheel using a corona electrostatic spray gun and then treated in an oven at 15° C. for 30 minutes and forcedly cured thereby forming powder paints film having high flatness.

TABLE 1

The composition of the primary coating powder paints in Examples

| Example | 1 | 2 | 3 |
|---|---|---|---|
| Polyester resin[A] | 350 | 350 | 350 |
| Epoxy resin[B] | 350 | 350 | 350 |
| Benzoin | 5 | 5 | 5 |
| Leveling agent 1[C] | 10 | | 10 |
| Leveling agent 2[D] | | 10 | |
| Adhesion promoter 1[E] | 3 | 8 | |
| Adhesion promoter 2[F] | 5 | | 8 |
| Ultraviolet stabilizer[G] | 5 | 5 | |
| Color pigment | 200 | 200 | 200 |
| Extender pigment[H] | 72 | 72 | 77 |
| Total | 1,000 | 1,000 | 1,000 |

[A]Polyester resin: solid state polyester having an acid value of 30 to 70 mg (KOH/g)
[B]Epoxy resin: visphenol A-type solid state epoxy having EEW of 600 to 1500
[C]Leveling agent 1: solid state amide-modified polyether available from TROY Chemical Corp.
[D]Leveling agent 2: acrylic oligomer impregnated into silica available from KSCNT Co., Ltd.
[E]Adhesion promoter 1: amide wax available from Lubrizol Corp.
[F]Adhesion promoter 2: silane coupling agent available from Chartwell International, Inc.
[G]Ultraviolet stabilizer: hals type ultraviolet stabilizer available from Ciba Specialty Chemicals
[H]Extender pigment: pigment of white or black color, which is not particularly limited as long as it can be used for powder paints

Example 4

In a 500 mL Schlenk flask equipped with a stirrer, 65.0 g (215 mmol) of 2-ethylhexylammonium 2-ethylhexylcarbamate was dissolved in 150.0 g of isopropanol and then, 20.0 g (86.2 mmol) of silver oxide was added and reaction was performed at room temperature. It could be observed that the reaction solution was initially a black slurry but it turned transparent as the reaction was proceeded and thus complex compound was produced, and a colorless, transparent solution was obtained after 2 hours of reaction. The resultant solution was added with 2.5 g of 2-hydroxy-2-methylpropylamine as a stabilizer and 85.0 g of n-butanol and 50.0 g of amyl alcohol as solvents and stirred. After that, the resultant solution was filtered with a 0.45 micron membrane filter thereby preparing silver coating composition having a silver content of 4.87 wt % (TGA analysis). Such prepared silver coating composition was coated to the aluminum wheel obtained in the Example 1 using a spray gun and then heat-treated in an infrared oven for 10 minutes, thereby obtaining a high glossy silver mirror surface. Physical properties of an interlayer adhesive force between such obtained silver mirror surface and the primary coat powder paints surface, silver mirror exhibiting performance, and color tone are shown in table 2.

Example 5

The silver coating composition prepared in the Example 4 was coated to the aluminum wheel obtained in the Example 2 using a spray gun and then heat-treated in an infrared oven for 10 minutes, thereby obtaining a high glossy silver mirror surface. Physical properties of an interlayer adhesive force between such obtained silver mirror surface and the primary coat powder paints surface, silver mirror exhibiting performance, and color tone are shown in table 2.

Example 6

The silver coating composition prepared in the Example 4 was coated to the aluminum wheel obtained in the Example 3 using a spray gun and then heat-treated in an infrared oven for 10 minutes, thereby obtaining a high glossy silver mirror surface. Physical properties of an interlayer adhesive force between such obtained silver mirror surface and the primary coat powder paints surface, silver mirror exhibiting performance, and color tone are shown in table 2.

Example 7

KR255 (produced by Shinetsu Chemical Co., Ltd.) which is a silicone-based curing resin was coated to the aluminum wheel coated with a powder paints in the Example 3 using a spray gun and then treated in an oven at 15° C. for 3 hours, thereby forming the precoat surface 2A. The silver coating composition prepared in the Example 4 was coated to such prepared precoat surface using a spray gun and then heat-treated in an infrared oven for 10 minutes, thereby obtaining a high glossy silver mirror surface. Physical properties of an interlayer adhesive force between such obtained silver mirror surface and the primary coat powder paints surface, silver mirror exhibiting performance, and color tone are shown in table 2.

Example 8

85.9 g of Demosphen 670BA (polyester polyol, produced by Bayer company) and, as curing agent, 15.0 g of Desmodur44V20 (produced by Bayer company) are mixed with 200 g of methoxypropylacetate, then stirred for 30 minutes and coated to the aluminum wheel coated with a powder paints in the Example 3 using a spray gun and then treated in an oven at 12° C. for 30 minutes, thereby forming the precoat surface 2A. The silver coating composition prepared in the example 4 was coated to such prepared precoat surface using a spray gun and then heat-treated in an infrared oven for 10 minutes, thereby obtaining a high glossy silver mirror surface. Physical properties of an interlayer adhesive force between such obtained silver mirror surface and the primary coat powder paints surface, silver mirror exhibiting performance, and color tone are shown in table 2.

Example 9

In a 500 mL Schlenk flask equipped with a stirrer, 33.8 g (111.7 mmol) of 2-ethylhexylammonium 2-ethylhexylcarbamate and 30.4 g (146 mmol) of isobutylammonium isobutylcarbamate were dissolved in 150.0 g of isopropanol and then, 20.0 g (86.2 mmol) of silver oxide was added and reaction was performed at room temperature. It could be observed that the reaction solution was initially a black slurry but it turned transparent as the reaction was proceeded and thus complex compound was produced, and a colorless, transparent solution was obtained after 2 hours of reaction. The resultant solution was added with 2.5 g of 2-hydroxy-2-methylpropylamine as a stabilizer, 2.4 g of silver octanoate as a thin film assistant and 75.0 g of n-butanol and 20.0 g of amyl alcohol as solvents and stirred. After that, the resultant solution was filtered with a 0.45 micron membrane filter thereby preparing silver coating composition having a silver content of 5.53 wt% (TGA analysis). The aluminum wheel obtained in the Example 1 was dip coated in such prepared silver coating composition and then heat-treated in an infrared oven for 10 minutes, thereby obtaining a high glossy silver mirror surface. Physical properties of an interlayer adhesive force between such obtained silver mirror surface and the primary coat powder paints surface, silver mirror exhibiting performance, and color tone are shown in table 2.

Example 10

In a 500 mL Schlenk flask equipped with a stirrer, 33.8 g (111.7 mmol) of 2-ethylhexylammonium 2-ethylhexylcarbamate and 30.4 g (146 mmol) of isobutylammonium isobutylcarbonate were dissolved in 150.0 g of isopropanol and then, 20.0 g (86.2 mmol) of silver oxide was added and reaction was performed at room temperature. It could be observed that the reaction solution was initially a black slurry but it turned transparent as the reaction was proceeded and thus complex compound was produced, and a colorless, transparent solution was obtained after 2 hours of reaction. The resultant solution was added with 2.5 g of 2-hydroxy-2-methylpropylamine as a stabilizer, 3.1 g of silver octanoate as a thin film assistant and 75.0 g of n-butanol and 20.0 g of amyl alcohol as solvents and stirred. After that, the resultant solution was filtered with a 0.45 micron membrane filter thereby preparing silver coating composition having a silver content of 5.16 wt % (TGA analysis). The aluminum wheel obtained in the Example 1 was dip coated in such prepared silver coating composition and then heat-treated in an infrared oven for 10 minutes, thereby obtaining a high glossy silver mirror surface. Physical properties of an interlayer adhesive force between such obtained silver mirror surface and the primary coat powder paints surface, silver mirror exhibiting performance, and color tone are shown in table 2.

TABLE 2

Physical properties of the silver mirror surface prepared in Examples

| Example | Interlayer adhesive force | silver mirror exhibiting performance | Color tone |
| --- | --- | --- | --- |
| Example 4 | ○ | ○ | White silver |
| Example 5 | ○ | ○ | White silver |
| Example 6 | Δ | ○ | White silver |
| Example 7 | ○ | ○ | White silver |
| Example 8 | ○ | Δ | Violet silver |
| Example 9 | ○ | ○ | Blue silver |
| Example 10 | ○ | ○ | Green silver |

(1) Evaluation for the interlayer adhesive force: 100 notches were made into lattice form on the silver mirror surface by making 11 scars by a space of 2 mm in longitudinal and lateral direction respectively using cutter knife and a cellophane tape (product name: Scotch tape, available from 3M Company) was adhered to and then removed from the silver mirror surface, and, after that, transformation state of a silver film to adhesion surface was evaluated.
○○: a case that there is no transformation of silver thin film to the adhesion surface of the tape
ΔΔ: a case that some of the silver thin film is transferred to the adhesion surface of the tape and thus separated from the base
xx: a case that most of the silver thin film is transferred to the adhesion surface of the tape and thus separated from the base
(2) Evaluation for the silver mirror exhibiting performance: Whether the silver mirror surface is formed well is evaluated.
○○: a case that an object is clearly viewed without haze when reflecting the object
ΔΔ: a case that an object is some hazily viewed when reflecting the object
xx: a case that an object is mostly hazily viewed when reflecting the object

Example 11

Spitight500+ (top coating solution produced by Samhwa Paints Industrial Co., Ltd.) containing acrylsilicone based resin was coated to the aluminum wheel formed with the high reflective silver mirror surface obtained in the Example 4 using a spray gun and then treated in an oven at 150° C. for 1 hours to form a transparent top coating surface, thereby manufacturing an aluminum wheel having a high gloss. Physical properties of such manufactured aluminum wheel are shown in table 3.

Example 12

SR2410 (top coating solution produced by produced by Toray Dow Corning Silicone Co., Ltd.),) containing acrylsilicone based resin was coated to the aluminum wheel formed with the high reflective silver mirror surface obtained in the Example 4 using a spray gun and then treated in an oven at 15° C. for 30 minutes to form a transparent top coating surface, thereby manufacturing an aluminum wheel having a high gloss. Physical properties of such manufactured aluminum wheel are shown in table 3.

Example 13

500 g of Spitight500+ (top coating solution produced by Samhwa Paints Industrial Co., Ltd.) containing acrylsilicone based resin was added to n-butanol solution dissolved with 6.0 g of hydrazine and stirred for 30 minutes and then coated to the aluminum wheel formed with the high reflective silver mirror surface obtained in the Example 4 using a spray gun and then treated in an oven at 150° C. for 1 hours to form a transparent top coating surface, thereby manufacturing an aluminum wheel having a high gloss. Physical properties of such manufactured aluminum wheel are shown in table 3.

Example 14

A water dispersion polyurethane resin containing 5 wt% of hydrazine was applied to the aluminum wheel formed with the high reflective silver mirror surface obtained in the Example 4 and then treated in an oven at 130° C. for 20 minutes, thereby obtaining the transparent coating surface 2B. Spitight500+ (top coating solution produced by Samhwa Paints Industrial Co., Ltd.) containing acrylsilicone based resin was coated to the above coating surface using a spray gun and then treated in an oven at 150° C. for 1 hours to form a transparent top coating surface, thereby manufacturing an aluminum wheel having a high gloss. Physical properties of such manufactured aluminum wheel are shown in table 3.

TABLE 3

Physical properties of the high glossy aluminum wheel prepared in Examples

| Example | Moisture resistant adhesive force | Salt water spray test | Pencil hardness | Color tone |
|---|---|---|---|---|
| Example 11 | ○ | ○ | 2 H | Gold |
| Example 12 | ○ | Δ | H | White silver |
| Example 13 | ○ | ○ | 2 H | White silver |
| Example 14 | ○ | ○ | 2 H | White silver |

(1) Evaluation for the moisture resistant adhesive force: The aluminum wheel was dipped in distilled water of 50° C. for 120 hours and dried at room temperature for 24 hours. After that, 100 notches were made into lattice form on the top coating surface by making 11 scars by a space of 2 mm in longitudinal and lateral direction respectively using cutter knife and a cellophane tape (product name: Scotch tape, available from 3M Company) was adhered to and then removed from the top coating surface and, after that, transformation state of the top coating surface to adhesion surface was evaluated.
○○: a case that there is no transformation of paint film to the adhesion surface of the tape
ΔΔ: a case that some of the paint film is transferred to the adhesion surface of the tape and thus separated from the base
xx: a case that most of the paint film is transferred to the adhesion surface of the tape and thus separated from the base
(2) Salt water spray test: A cross cut was made by making scars on the aluminum wheel using a cutter knife and salt water was sprayed to the cross cut on the aluminum wheel for 24 hours and then the aluminum wheel was leaved in a humid atmosphere at a temperature of 40° C. and relative humidity of 75% for 960 hours and, after that, a state was evaluated.
○○: a corroded width is less than 0.5 mm
ΔΔ: a corroded width is from 1.0 to 2.0 mm
xx: a corroded width exceeds 2.0 mm
(3) Pencil hardness: the top coating surface was rubbed with pencils having different hardnesses at an angle of 45° and measurement of hardness was performed using a pencil hardness meter having 1 Kg of pressure load.

INDUSTRIAL APPLICABILITY

In accordance with the present invention, it is possible to provide a method for manufacturing an aluminum wheel having high gloss by improving a flatness of the aluminum wheel having a rough surface using powder paints, applying silver coating solution containing a silver complex compound having a special structure to form a high reflective silver mirror surface and then forming a transparent coating to protect the silver mirror surface.

Also, in accordance with the present invention, it is possible to provide an aluminum wheel and a method for manufacturing the same, which can be mass produced without air pollution and water pollution and a procedure is simple, thus an error rate is low and a cost for manufacture is inexpensive.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:
1. A method for manufacturing an aluminum wheel having a mirror surface, comprising the steps of:
(i) coating a powder paint on a surface of an aluminum wheel; and

(ii) applying a silver coating solution containing a silver complex compound, which is obtained by reacting at least one silver compound represented by the following chemical formula 1 with at least one ammonium carbamate or ammonium carbonate based compound represented by one of the chemical formula 2 to the chemical formula 4, onto the powder paints coating surface to form a silver coating film which forms a silver mirror surface:

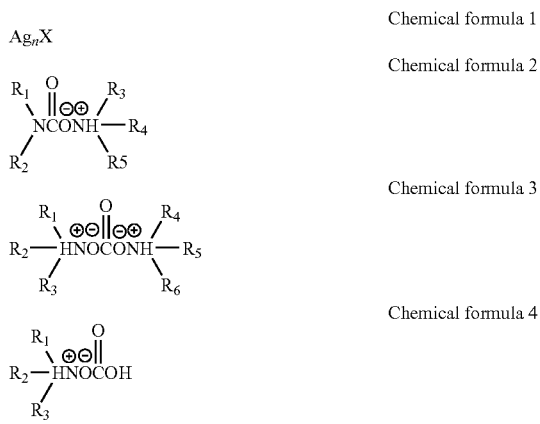

wherein, in the chemical formula 1 to chemical formula 4, X represents a substituent selected from oxygen, sulfur, halogen, cyano, cynate, carbonate, nitrate, nitrite, sulfate, phosphate, thiocyanate, chlorate, perchlorate, tetrafluoroborate, acetylacetonate, carboxylate and derivatives thereof, n represents an integer of 1 to 4, and the ammonium carbamate or ammonium carbonate based compound is one or a mixture of more than two selected from ethylammonium ethylcarbamate, isopropylainmonium isopropylcarbamate, n-butylammonium n-butylcarbamate, isobutylammonium isobutylcarbamate, t-butylammonium t-butylcarbamate, 2-ethylhexylammonium 2-ethylhexylcarbamate, octadecylammonium octadecylcarbamate, 2-methoxyethylammonium 2-methoxyethylcarbamate, 2-cyanoethylammonium 2-cyanoethylcarbamate, dibutylammonium dibutylcarbamate, dioctadecylammonium dioctadecylcarbamate, methyldecylammonium methyldecylcarbamate, hexamethyleneminium hexamethyleneiminecarbamate, morpholinium morpholinecarbamate, pyridinium ethylhexylcarbamate, triethylenediaminium isopropylbicarbamate, benzylammonium benzylcarbamate, triethoxysilylpropylammonium triethoxysilylpropylcarbamate, ethylammonium ethylcarbonate, isopropylammonium isopropylcarbonate, isopropylammonium bicarbonate, n-butylammonium n-butylcarbonate, isobutylammonium isobutylcarbonate, t-butylammonium t-butylcarbonate, t-butylammonium bicarbonate, 2-ethylhexylammonium 2-ethylhexylcarbonate, 2-ethylhexylammonium bicarbonate, 2-methoxyethylammonium 2-methoxyethylcarbonate, 2-methoxyethylammonium bicarbonate, 2-cyanoethylammonium 2-cyanoethylcarbonate, 2-cyanoethylammonium bicarbonate, octadecylammonium octadecylcarbonate, dibutylammonium dibutylcarbonate, dioctadecylammonium dioctadecylcarbonate, dioctadecylammonium bicarbonate, methyldecylammonium methyldecylcarbonate, hexamethyleneiminium hexamethyleneiminecarbonate, morpholinium morpholinecarbonate, benzylammonium benzylcarbonate, triethoxysilylpropylammonium triethoxysilylpropylcarbonate, pyridinium bicarbonate, triethylenediaminium isopropylcarbonate, triethylenediaminium bicarbonate and a derivative thereof.

2. The method for manufacturing an aluminum wheel having a mirror surface as set forth in claim 1, further comprising the step of:
(iii) applying a transparent coating solution on the silver coating film to form a transparent top coating after the step (ii).

3. The method for manufacturing an aluminum wheel having a mirror surface as set forth in claim 2, wherein the transparent coating solution includes a reduction agent.

4. The method for manufacturing an aluminum wheel having a mirror surface as set forth in claim 3, wherein the reduction agent is selected from hydrazine, acetic hydrazide, sodium or potassium borohydride, trisodium citrate, an amine compound selected from methyldiethanolamine and dimethylamine borane, a metal salt selected from ferrous chloride and iron sulfate, hydrogen, hydrogen iodide, carbon monoxide, an aldehyde compound selected from formaldehyde and acetaldehyde, glucose, salicylic acid, tannic acid, pyrogallol and hydroquinone.

5. The method for manufacturing an aluminum wheel having a mirror surface as set forth in claim 2, further comprising a step of forming a transparent coating to form a post coat between the steps (ii) and (iii).

6. The method for manufacturing an aluminum wheel having a mirror surface as set forth in claim 5, wherein a solution composition for the transparent coating is a polymeric resin selected from water dispersion urethane resin, silicone resin and acryl resin, metal compounds selected from silane coupling agent, zirconium coupling agent, titanium coupling agent and metal precursor.

7. The method for manufacturing an aluminum wheel having a mirror surface as set forth in claim 1, wherein the powder paint includes a thermosetting resin and a curing agent.

8. The method for manufacturing an aluminum wheel having a mirror surface as set forth in claim 7, wherein the thermosetting resin is selected from polyester, epoxy, acryl and polyester-epoxy hybrid resin.

9. The method for manufacturing an aluminum wheel having a mirror surface as set forth in claim 1, wherein the powder paint coating in the step (i) is performed in a spray manner by a corona electrostatic coating.

10. The method for manufacturing an aluminum wheel having a mirror surface as set forth in claim 1, wherein the coated aluminum wheel is calcinated after the application of the silver coating solution in the step (ii).

11. The method for manufacturing an aluminum wheel having a mirror surface as set forth in claim 1, wherein the silver compound is one or a mixture of more than two selected from silver oxide, silver thiocyanate, silver sulfide, silver chloride, silver cyanide, silver cyanate, silver carbonate, silver nitrate, silver nitrite, silver sulfate, silver phosphate, silver perchlorate, silver tetrafluoroborate, silver acetylacetonate, silver acetate, silver lactate, silver oxalate or a derivative thereof.

12. The method for manufacturing an aluminum wheel having a mirror surface as set forth in claim 1, wherein the silver coating solution further includes a solvent, a stabilizer, a leveling agent or a thin film assistant alone or a mixture thereof.

13. The method for manufacturing an aluminum wheel having a mirror surface as set forth in claim 12, wherein the solvent is one or a mixture of more than two selected from water, alcohol, glycol, acetate, ether, ketone, aliphatic hydrocarbon, aromatic hydrocarbon and halogenated hydrocarbon solvents.

14. The method for manufacturing an aluminum wheel having a mirror surface as set forth in claim 12, wherein the solvent is one or a mixture of more than two selected from water, methanol, ethanol, isopropanol, butanol, ethylene glycol, glycerine, ethyl acetate, butyl acetate and carbitol acetate, diethyl ether, tetrahydrofuran, dioxane, methyl ethyl ketone, acetone, hexane, heptane, benzene, toluene, chloroform, methylene chloride and carbon tetrachloride, and a mixture thereof.

15. The method for manufacturing an aluminum wheel having a mirror surface as set forth in claim 12, wherein the stabilizer is at least one selected from an amine compound, a compound represented by one of the chemical formula 2 to the chemical formula 4, a phosphorus compound and a sulfur compound.

16. The method for manufacturing an aluminum wheel having a mirror surface as set forth in claim 15, wherein the phosphorus compound is selected from compounds represented by the chemical formula 6, the chemical formula 7 and the chemical formula 8, and the sulfur compound is selected from butanethiol, n-hexanethiol, diethyl sulfide, and tetrahydrothiophene, $$R_3P \quad \text{Chemical formula 6}$$

$$(RO)_3P \quad \text{Chemical formula 7}$$

$$(RO)_3PO \quad \text{Chemical formula 8}$$

wherein, in the chemical formulas, R represents a substituent selected from $C_1$-$C_{20}$ alkyl or aryl group.

17. The method for manufacturing an aluminum wheel having a mirror surface as set forth in claim 12, wherein the thin film assistant is at least one selected from an organic acid, an ammonium salt of an organic acid and a metal salt of an organic acid.

18. The method for manufacturing an aluminum wheel having a mirror surface as set forth in claim 1, further comprising a step of coating and drying a primer to form a precoat surface between the steps (i) and (ii).

19. The method for manufacturing an aluminum wheel having a mirror surface as set forth in claim 18, wherein the primer is selected from alkyd resin, polyester resin, silicone resin, polyurethane resin, epoxy resin, phenol resin, polyamide resin, melamine resin, acryl resin, unsaturated polyester resin, polyvinyl butyral resin and a mixture thereof.

* * * * *